US009489638B2

(12) United States Patent
Shivashankar et al.

(10) Patent No.: US 9,489,638 B2
(45) Date of Patent: Nov. 8, 2016

(54) METHOD AND APPARATUS FOR PROPAGATING USER PREFERENCE INFORMATION IN A COMMUNICATIONS NETWORK

(71) Applicant: Telefonaktiebolaget L M Ericsson (publ), Stockholm (SE)

(72) Inventors: Subramanian Shivashankar, Chennai (IN); Brindha Padmanaabhan, Chennai (IN); Manoj Prasanna Kumar, Chennai (IN); Karthikeyan Premkumar, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 539 days.

(21) Appl. No.: 13/958,033

(22) Filed: Aug. 2, 2013

(65) Prior Publication Data

US 2015/0039539 A1 Feb. 5, 2015

(51) Int. Cl.
*G06F 15/18* (2006.01)
*G06N 99/00* (2010.01)
*G06N 5/02* (2006.01)

(52) U.S. Cl.
CPC .............. *G06N 99/005* (2013.01); *G06N 5/02* (2013.01)

(58) Field of Classification Search
None
See application file for complete search history.

(56) References Cited

U.S. PATENT DOCUMENTS

| 8,600,993 | B1* | 12/2013 | Gupta | G06F 17/30876 707/709 |
| 8,805,851 | B2* | 8/2014 | Koike | G06Q 30/02 707/736 |
| 2001/0013009 | A1* | 8/2001 | Greening | G06Q 10/063112 705/7.14 |
| 2010/0049770 | A1* | 2/2010 | Ismalon | G06F 17/30646 707/765 |
| 2010/0088265 | A1* | 4/2010 | Pohl | G06Q 30/02 706/46 |
| 2011/0173662 | A1* | 7/2011 | Beppu | H04N 21/466 725/46 |
| 2013/0325627 | A1* | 12/2013 | Kimmerling | G06F 17/30386 705/14.66 |
| 2014/0108308 | A1* | 4/2014 | Stout | G06N 3/08 706/12 |
| 2014/0115010 | A1* | 4/2014 | Seth | G06F 17/30861 707/798 |

* cited by examiner

*Primary Examiner* — Luis Sitiriche
(74) *Attorney, Agent, or Firm* — Patent Portfolio Builders, PLLC

(57) ABSTRACT

A method for propagating user preference information in a communications network, in which the user preference information may be available for a subset of users within the network. The method comprises generating individual user attribute vectors, based on user historical data and estimating user preference information. The method further comprises defining a community structure for the network and generating a stacked representation for users, the representation comprising the user attribute vector augmented with an aggregated vector of estimated user preferences of members of the user's community. The method further comprises learning a function relating the stacked representation to user preference, using the subset of users, and applying the learned function to users outside the subset.

14 Claims, 4 Drawing Sheets

METHOD AND APPARATUS FOR PROPAGATING USER PREFERENCE INFORMATION IN A COMMUNICATIONS NETWORK

TECHNICAL FIELD

The present invention relates to a method and an apparatus for propagating user preference information in a communications network. The invention also relates to a computer program product configured to carry out a method for propagating user preference information in a communications network.

BACKGROUND

Communication networks are widely used across many industries and sections of society. Such networks may include, for example, telecommunications networks and social media networks. The use of communication networks is growing, with continual expansion of customer bases and a steady flow of innovation providing new ways to connect and interact with other users within a network.

The communication network itself provides a framework, allowing diverse groups of individuals to form connections and exchange information within the network. Connections between individual users within the network may take various forms including friendship, professional relations, common interests, shared knowledge or backgrounds. A full service network provides a broad range of connection and communication options as well as an array of additional and value added services. Usage information may be extracted from such networks to generate a user profile, which may then form the basis of personalised service offerings to users, personalised advertising or other activity on the part of the network operator aimed at improving customer satisfaction and/or retention or other aspects of network operation.

When generating a profile for a user within a communications network such as a telecommunications network, multiple sources of data concerning the user may be available. These may include for example call usage information and uptake and usage of value added services (VAS). In addition, if a user obtains internet access via the telecommunications network, broadband usage and browsing history for the user may also be available. Social media information may be obtained through deep packet inspection, and if the user makes use of mobile payment services via a connected network device, including for example mobile wallet, then product interests for the user may also be available. For some users, sufficient information may be available to allow the inferring of user interests and preferences, which may then form the basis of the personalised service offerings and other activity discussed above. This insight may offer considerable advantages to network operators in their network management, but may only be available for a small subset of users who make the fullest use of the available network services. For a large proportion of users within the network, sufficient information to enable the extraction of user interests and preferences may not be available.

SUMMARY

It is an aim of the present invention to provide a method, apparatus, computer program and computer program product which obviate or reduce at least one or more of the disadvantages mentioned above.

According to an aspect of the present invention, there is provided a method for propagating user preference information in a communications network, wherein user preference information is available for a subset of users within the network, the method comprising: generating individual user attribute vectors, based on user historical data, and estimating user preference information. The method further comprises defining a community structure for the network and generating a stacked representation for users, the representation comprising the user attribute vector augmented with an aggregated vector of estimated user preferences of members of the user's community. The method further comprises learning a function relating the stacked representation to user preference, using the subset of users, and applying the learned function to users outside the subset.

Aspects of the present invention thus enable the propagation of preference information which may be available for a subset of users, to network users outside the subset. The stacked representation of the above aspect of the present invention enables the generation of user preference information which is based not only on a user's historical behaviour but also on insight gained through the user's social connections. By learning a function relating the stacked representation to user preferences, the correct combination of importance to be assigned to historical behaviour and social influences can be established. The defining of a community structure allows tailoring of the social connection information taken into account to the task in hand. Thus community structure may comprise an extended family, friends, friends of friends etc., and these connections may be defined according to any information available through the network, including call data, browsing data, mobility data etc.

The preference information to be propagated may for example relate to general user interests or to more specific aspects of those interests such as entertainment choices or location preferences. Preference information may be expressed as a ranking of the subject of the preference information, thus for example a ranking of user interests, entertainment choices, or locations.

According to embodiments of the invention, the method may further comprise updating the aggregated vectors with the preferences generated through applying the learned function, and repeating the steps of learning a function relating the stacked representation to user preference, applying the learned function to users outside the subset and updating the aggregated vectors until a convergence threshold is reached.

A convergence threshold may for example be a limiting value of change in user preferences between iterations. Aspects of the invention thus allow for refining of the learned function through multiple iterations, so arriving at an increasingly accurate propagation of user preferences based on the data available from the subset of users for whom preference information is available.

According to embodiments of the invention, generating individual user attribute vectors may comprise processing historical data held for the user.

The attribute vector may be generated from historical data in a range of different ways. In one example, a document may be generated comprising meta-data of sites browsed by the user and a term frequency vector may be constructed to characterise the user based on this document. In other examples, a webpage may be used as a source, and a term frequency vector may be constructed using the "bag-of-words" model. In still further examples, latent models may be used to project browsing information onto a topic space, which may then be used to characterise a user. In some examples, the generation of the attribute vector may be determined by a particular task. For example, if the preferences to be propagated are general user interests, a suitable basis for the construction of user attribute vectors may be selected to represent this. Alternatively, if location preferences are to be propagated, different historical data may be relevant, and so a different basis for the construction of user attribute vectors may be selected.

According to further embodiments of the invention, if no historical data is held for a user, generating an attribute vector may comprise assigning an attribute vector based upon historical data in the network.

In some examples, an average of user attribute vectors for users in the network may be assigned. In other examples, the most prevalent user attribute vector in the network may be assigned. In still further examples, reference may be made to a user's community, assigning a typical, average or most prevalent user attribute vector based on the members of the user's community. In still further examples, the user attribute vector of a user having the strongest ties with the subject user may be assigned to the subject user.

According to embodiments of the invention, estimating user preference information may comprise learning a function relating user attribute vectors to user preference, using the subset of users, and applying the learned function to generate estimated user preference information for users outside the subset.

By learning a function relating the attribute vector to preference information, an initial estimation of preference information for users outside the subset may be made, based solely on their historical data. This may then contribute to the generation of preference information based both on historical user data and on insight obtained from the user's social connections.

According to further embodiments of the present invention, if no historical data is held for a user, estimating user preference information may comprise assigning preferences to the user based on user preferences within the network.

These assigned preferences may enable the formation of the aggregated vector of community preference information for other users. Assigning preferences to a user may comprise replicating the preferences of members of the user's community or for example assigning the user the most prevalent preference profile within the network or their particular community.

According to embodiments of the invention, defining a community structure for the network may comprise characterising the links between a user and another user which allow the other user to be considered a member of the user's community.

In some examples, the process of defining a community structure for the network may be unique for each new task, as the nature of the links may depend upon the nature of the preferences being propagated. For example, for interest preference propagation the links may be social links underlying friendship groups and may therefore include family ties and friendship links as defined by the network. The community structure for a particular task may include direct friendship links only, friends of friends etc. In other examples, community forming links may comprise shared browsing habits, shared mobility information including visiting the same places of interest, gathering places etc. The community forming links may be represented on a graph of the network, which may be established on the basis of call data, browsing history, user mobility etc. according to the current task.

According to embodiments of the invention, augmenting the user attribute vector with the aggregated vector of estimated user preferences of members of the user's community may comprise applying at least one of an append operation, a summation, an average or a projection algorithm.

According to embodiments of the invention, the aggregated vector of estimated user preferences of members of the user's community may comprise at least one of: a rank aggregated vector or an averaged vector.

According to embodiments of the invention, if the aggregated vector is an averaged vector, the average may be weighted according to a strength of links between the user and individual members of the user's community. An average weighted according to a strength of links between the user and individual members of the user's community may provide increased accuracy in representing the influence each community member is likely to have on the preferences of the user under consideration.

According to another aspect of the present invention, there is provided a method for generating user preference information in a communications network, the method comprising: generating individual user attribute vectors based on user historical data, and estimating user preference information based on the attribute vectors. The method further comprises defining a community structure for the network and generating a stacked representation for users, the representation comprising the estimated preference information for a user augmented with an aggregated vector of estimated user preferences of members of the user's community. The method further comprises calculating user preference information for users as an average of the elements of the stacked representation.

Aspects of the present invention thus enable the generation of preference data in a network where no preference data was previously available to allow learning of functions linking historical data to preference information, i.e. in an unlabeled network. The stacked representation of the above aspect again enables insight to be drawn both from a user's historical data and from their social connections.

According to embodiments of the invention, the method may further comprise updating the aggregated vectors with the calculated user preference information, and repeating the steps of calculating user preference information for users and updating the aggregated vectors until a convergence threshold is reached.

A convergence threshold may for example be a limiting value of change in user preferences between iterations.

According to embodiments of the invention, calculating user preference information may comprise calculating a weighted average of the elements of the stacked representation, and the method may further comprise selecting weighting functions for the elements of the stacked representation.

The weighting functions may control the influence accorded to preference estimated based on a user's historical data and preference estimated based on a user's social connections. According to some examples, the weighting functions may be weighting vectors or may be weighting values.

According to embodiments of the invention, the method may further comprise repeating the steps of calculating user preference information for users and updating the aggregated vectors until a convergence threshold is reached while applying different values of the weighting functions.

In this manner, an additional iteration loop may be introduced to find the most effective weighting functions for use in averaging the elements of the stacked representation.

According to another aspect of the present invention, there is provided a computer program product configured, when run on a computer, to carry out a method according to either the first or second aspect of the present invention.

According to another aspect of the present invention, there is provided a computer program configured, when run on a computer, to carry out a method according to either the first or second aspect of the present invention.

The computer program product or computer program may be stored on a computer-readable medium, or could, for example, be in the form of a signal such as a downloadable data signal provided from an Internet website, or could be in any other form.

According to another aspect of the present invention, there is provided an apparatus for propagating user preference information in a communications network, wherein user preference information is available for a subset of users within the network, the apparatus comprising: a generating unit configured to generate individual user attribute vectors based on user historical data, an estimating unit configured to estimate user preference information, a task unit configured to define a community structure for the network, and a stacking unit configured to generate a stacked representation for users, the representation comprising the user attribute vector augmented with an aggregated vector of estimated user preferences of members of the user's community. The apparatus further comprises a learning unit configured to learn a function relating the stacked representation to user preference, using the subset of users, and an application unit configured to apply the learned function to users outside the subset.

The units of the apparatus may be functional units and may be realised in any combination of hardware and/or software.

According to some examples, the generating unit may generate individual user attribute vectors according to information received from the task unit. According to still further examples, the generating unit may be incorporated within the task unit.

According to embodiments of the invention, the stacking, learning and application units may be further configured to update the aggregated vectors with preferences generated by the application unit, and to repeat the learning and application of the function. The apparatus may further comprise an iteration unit configured to monitor a convergence threshold.

According to embodiments of the invention, the generating unit may be configured to generate individual user attribute vectors by processing historical data held for the user.

According to embodiments of the invention, if no historical data is held for a user, the generating unit may be configured to generate an individual user attribute vector by assigning an attribute vector based upon historical data in the network.

According to embodiments of the invention, the estimating unit may be configured to estimate user preference information by learning a function relating user attribute vectors to user preference, using the subset of users, and applying the learned function to generate estimated user preference information for users outside the subset.

According to embodiments of the invention, if no historical data is held for a user, the estimating unit may be configured to estimate user preference information by assigning preferences to the user based on user preferences within the network.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
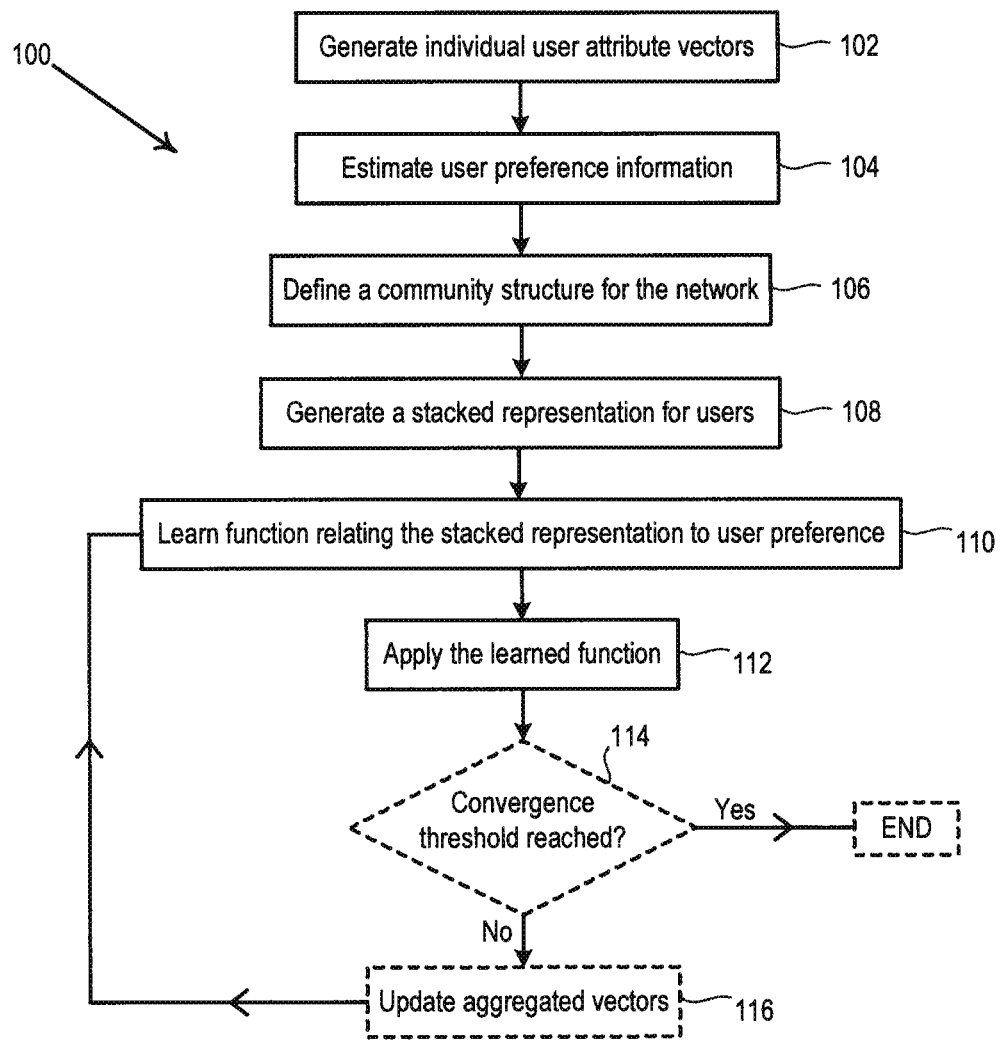
FIG. 1 is a flow chart illustrating process steps in a method for propagating user preference information in a communications network.

FIG. 1 illustrates steps in a method 100 for propagating user preference information in a communications network. The network may for example be a telecommunications network. As discussed in further detail below, the network may be represented by a graph G, in which users are represented as nodes N, where n∈N. Preference information may be available for a subset of nodes $n_k$∈N, where $n_k$ are referred to as the labelled nodes in the network. This preference information may be inferred from user data such as mobile wallet or value added service data, which is available for the subset $n_k$ of nodes, but not for the remaining nodes in the network.

Referring to FIG. 1, a first step 102 involves generating individual user attribute vectors for users in the network. A user attribute vector may be constructed from historical network data concerning the individual user. Data available for a user may include call data, browsing history, mobility data etc. The precise data used to generate the user attribute vector may depend upon the nature of a particular task, that is the nature of the preference information to be propagated. The following discussion considers the example of general user interest propagation, however other examples may be considered and are discussed briefly later in the present description.

In order to construct a user attribute vector from historical data, a user interest space may first be decided upon, including for example sports, politics, astrology, cinema, music, gaming etc. The available historical data for a user may then be mined to generate the user attribute vector relevant to these interests. In one example, this may be achieved by generating a document comprising the meta data of all the web pages browsed by the user. A term frequency vector may then me generated based upon this document and used as the attribute vector for the user. Other representations may be used for generating the user attribute vector, including for example using the source of web pages browsed by the user and constructing a term frequency vector using the "bag-of-words" model. Latent models may also be used to project the browsing information into a topic space which may then be used to characterise the user in the user attribute vector. The choice of which method to use for generating the user attribute vector may be based upon available resources, a particular propagation task, or may be made empirically.

It will be appreciated that the relevant historical data for generating a particular user attribute vector may not be available for all users. In the present example, the browsing data from which a user attribute vector may be generated may not be available for users who do not obtain internet access services through the communications network operator. In such cases, an alternative method for generating a user attribute vector may be used, according to which a user is assigned a user attribute vector based on historical user data held within the network. This may involve calculating an average of user attribute vectors for users in the network and assigning this average to users for whom the relevant historical data is not available. In other examples, the most prevalent user attribute vector in the network may be assigned to users for whom historical data is not available. In still further examples, reference may be made to a user's community, assigning a typical, average or most prevalent user attribute vector based on the members of the user's community. In still further examples, the user attribute vector of a user having the strongest ties with the subject user may be assigned to the subject user. Formation of communities is discussed in further detail below.

Figure 2:
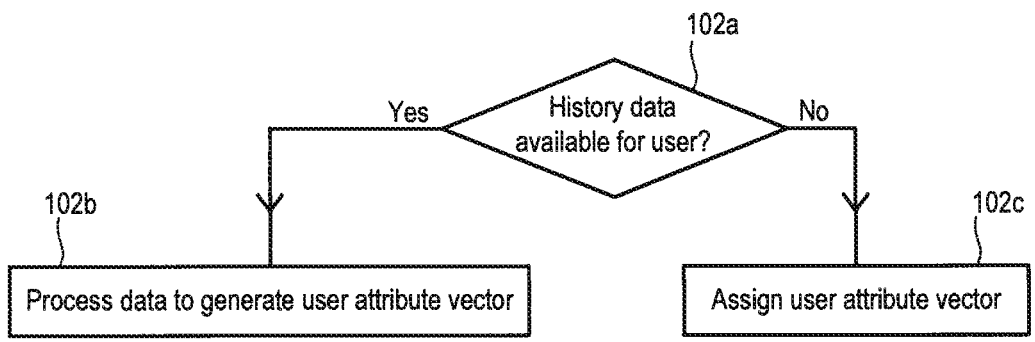
FIG. 2 is a partial flow chart illustrating how a step of the process of FIG. 1 may be achieved through different sub steps.

It will be appreciated from the above discussion that the generation of individual user attribute vectors at step 102 of the process may involve different actions depending upon the availability of relevant historical data for a particular user. Thus step 102 may be achieved via the sub steps of FIG. 2. Referring to FIG. 2, in a first sub step 102*a*, a determination is made as to whether the relevant historical data is available for the user in question. If such data is available (Yes at sub step 102*a*), the historical data is processed as discussed above to generate the user attribute vector at step 102*b*. If the relevant historical data is not available (No at sub step 102*a*), a user attribute vector is assigned to the user at step 102*c*. The user attribute vectors generated at step 102 of the method 100 are referred to in the following discussion as vectors X, where each node n is characterised by its user attribute vector X.

Referring again to FIG. 1, having generated the individual user attribute vectors X at step 102, the method 100 then proceeds to estimate user preference information for users in the network at step 104. As discussed above, user preference information relevant to the propagation task at hand may be available for a subset $n_k$ of users N in the network. These nodes are considered as labelled nodes, the preference information providing a label that the method seeks to propagate throughout the network. In order to proceed with subsequent method steps as explained below, it is desirable to estimate the preference information for the remaining, unlabelled nodes. The process for estimating user preference information is illustrated in further detail in FIG. 3, in which sub steps 104*a* to 104*d* are illustrated.

Figure 3:
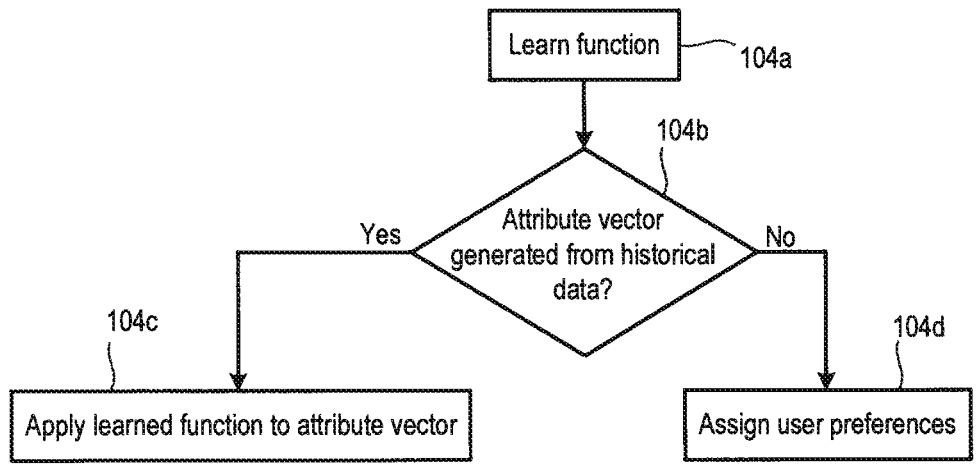
FIG. 3 is a partial flow chart illustrating how another step in the process of FIG. 1 may be achieved through different sub steps.

Referring to FIG. 3, in a first sub step 104*a*, the method learns a function $F_0$ linking user attribute vector X to preference information. The function $F_0$ may be considered as a ranking function, via which the interests represented in the user attribute vectors X are ranked according to user preference. This ranking can be inferred through additional user data which is available for the subset $n_k$ of labelled nodes. The subset $n_k$ may therefore be used to learn the ranking function $F_0$ which estimates preference information based upon user historical data as represented by the user attribute vector X. The function $F_0(X)$ is therefore learned using the labelled subset $n_k$. Once learned, the function $F_0(X)$ may be applied to the remaining unlabelled nodes in order to estimate their preference information. Before applying the function $F_0(X)$ to a user attribute vector X, the method first establishes, at sub step 104*b*, whether or not the user attribute vector X has been generated from the user's historical data. If the user attribute vector has been generated from the user's historical data (Yes at sub step 104*b*), the method proceeds to apply the function $F_0(X)$ in order to estimate preference information for the user at sub step 104*c*. If however the user attribute vector was assigned to the user owing to a lack of relevant historical data for the user (No at step 104*b*), the method proceeds to assign preferences to the user at sub step 104*d*.

As discussed above for the assigning of user attribute vectors, assigning user preferences may involve assigning an average or most prevalent user preference profile from the network to the user in question. Alternatively, reference may be made to a user's community, assigning a typical, average or most prevalent user preference profile based on the members of the user's community. In still further examples, the preference profile of a user having the strongest ties with the subject user may be assigned to the subject user. The formation of communities is discussed in further detail below. The most effective basis for assigning both user attribute vectors and user preference profiles for nodes having missing historical data may be established empirically.

Referring again to FIG. 1, the method proceeds to define a community structure for the network at step 106. The method 100 of FIG. 1 exploits the intuitive understanding that the interests of a user are likely to be influenced by his interactions with others, and particularly by interactions with those to whom he is most closely connected, including for example friends, family, colleagues etc. Community analysis of a network is typically targeted at identifying such groups of closely connected users. Interactions between users in a network are typically captured via consideration of links between users in the network. Such links are represented graphically as edges between nodes on a network graph G. What constitutes a link between users may depend upon the nature of the network and on the purpose for which network analysis is being conducted. For example, in a network represented by a call graph $G_{call}$, links are typically formed by a reciprocal call relationship, meaning that A has called B and B has called A. In an internet browsing graph $G_{browse}$, links may be formed by shared browsing activity, meaning that both A and B have browsed the same site. In a mobility graph $G_{mobility}$, links may be formed time spent in the same location, place of interest, entertainment venue, café, bar, restaurant etc.

In defining a community structure for the network at step 106, the method not only establishes which type of links are to be considered (call links, mobility links, browsing links etc) but also the closeness of links that may be considered as defining the limits of a user's community, so characterising the links which may be considered to form the community for a particular user. Thus for example, if the current task calls for propagation of general user interests, then both call and browsing graphs may be considered, and a user's community may be considered to include all users with which he has a first generation link (friends). If the current task calls for propagation of preferences for locations in which to spend time socially, then both call and mobility graphs may be considered, and a user's community may be considered to contain all users with which he has a first generation link (friends) and a second generation link (friends of friends), as a location for social gathering may often be influenced by relatively remote connections, such as a friend of a friend. It will be appreciated that both the basis for consideration and the limits of a user's community may be defined according to the propagation task in hand.

It is noted that steps 102, 104 and 106 of the method 100 may be conducted in an order different to that illustrated in FIG. 1 and discussed above. For example, community structure may be defined before generating user attribute vectors and estimating preference information, in order to allow reference to a user's community when assigning user attribute vectors and user preferences to users for whom the relevant historical data is not available.

Referring again to FIG. 1, once the user attribute vectors, estimated preferences and community structure are available, the method 100 proceeds to generate a stacked representation for users at step 108. The stacked representation encompasses the two sources of information which enable the method 100 to propagate user preference information: historical activity of the user, captured in the user attribute vector, and the influence of the user's community, captured in an aggregated vector of estimated user preferences of members of the user's community. This aggregated vector of community preferences is referred to as L and is generated by aggregating the estimated preferences of all users included within the user in question's community. Each user thus has a unique community preference vector L. The preferences of the user's community members may be averaged or may be rank aggregated. In the case of an averaged vector L, the average may be weighted according to an importance of the link between the user and each member of his community. Links between community members may be weighted according to the strength of interaction or connection between the members in various ways, according to the nature of the links and the information available. Weighting the averaged vector L in this manner ensures that the contribution of those most closely connected to a user, and hence most likely to have the greatest influence on the user, is more strongly represented in the user's community preference vector L. It will be appreciated that if the user's community includes nodes from the subset $n_k$, then the estimated preferences may be replaced by the preference profiles which are available for nodes in the subset $n_k$.

The stacked representation generated in step 108 combines the two sources of information by augmenting the attribute vector X with the community preference vector L to form stacked representation $X_u=X\Psi L$. The augment function $\Psi$ may be a simple append operation or may be a summation, an average or a projection algorithm that maps the historical information captured in the user attribute vector and the social influence captured in the community preference vector to a single feature space.

Having generated the stacked representation $X_u$ for users in the network, the method 100 then proceeds in step 110 to learn a function F linking the stacked representation to user preferences. As for the earlier learned function $F_0$, the function F is learned using the labelled subset $n_k$. In mobile social networks, interactions typically form a long tailed distribution, meaning many users interact with only a small number of other users, and the volume of interactions is low. For such users, the influence of the user's community is likely to be relatively low, and so in establishing the user's preferences, the user's historical activity represented by his user attribute vector X should take greater importance. In contrast, for highly social users showing high volume interaction with a large community, community influence is likely to be high. In order to effectively leverage the information from historical data and community influence, the method 100 learns a function $F(X_u)$ linking the stacked representation $X_u$ to user preference, using the user preference information extracted from user data that is available for the subset of nodes $n_k$.

Once the function $F(X_u)$ has been learned, the method 100 proceeds in step 112 to apply the learned function $F(X_u)$ to the unlabelled nodes outside the subset $n_k$ in order to generate user preference information for these nodes. The generated user preference information captures the influence both of historical user action (via attribute vector X) and of the user's community (via community preference vector L), and propagates the available user preference information from the labelled subset by using this subset to learn the bootstrap function $F_0(X)$ and the main preference function $F(X_u)$.

The method 100 may then proceed to iterate until a convergence threshold is reached. Following the first generation of preference values through the application of $F(X_u)$ at step 112, the community preference vectors L for all nodes may be updated at step 116, with the newly generated ($F(X_u)$) preference profiles for community members replacing the estimated preference information that was used initially. The updated community preference vectors L result in updated stacked representations $X_u$ for the network nodes. The method 100 then returns to step 110 to relearn the function $F(X_u)$ using the updated $X_u$ vectors of the subset $n_k$. The relearned function $F(X_u)$ is then applied at step 112 to the network nodes to generate updated preference profiles. At step 114, the method then checks whether a convergence threshold has been reached. If the convergence threshold has been reached (Yes at step 114), the method 100 ends and the generated preference profiles for the network nodes may be used for whatever purpose the network operator requires. If however the convergence threshold has not yet been reached (No at step 114), then the community preference vectors L are again updated with the newly generated preference profiles of the community members, the stacked representations $X_u$ are consequently updated and the function $F(X_u)$ is again re-learnt and re-applied to the remaining network nodes.

The convergence threshold may for example be a limiting change in preference profiles between iterations. Thus for a convergence threshold $\Delta$, the process would end when the change in preference profiles between iterations was less than the value $\Delta$. The precise value for $\Delta$ may be established empirically for each data set.

It can be appreciated from the above description that the method 100 effectively combines information from a user's historical actions with insight from their social connections in order to propagate preference information through a partially labelled network. The network may be very sparsely labelled, with a very small subset $n_k$, and the method will still combine the available sources of information to accurately propagate the preference information through the network. This may be appreciated by consideration of the example social networks of FIG. 5.

Figure 5:
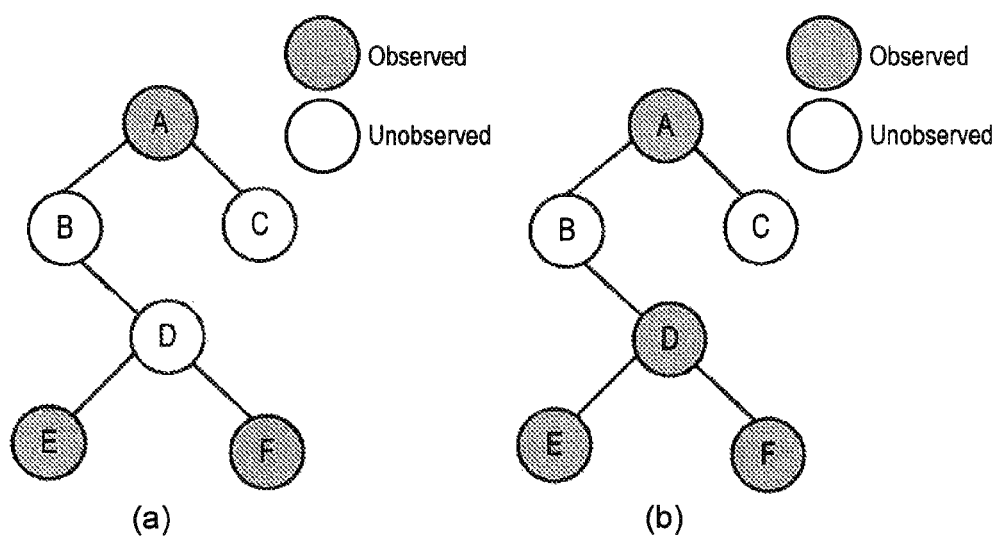
FIG. 5 is a representation of users in a network.

FIG. 5 illustrates two examples of a small partially labelled social network. In FIG. 5a, preference information is available for nodes A, E and F, with nodes B, C and D being unlabelled with such information, or "unobserved". In FIG. 5b, nodes A, D, E and F are all labelled with preference information, while nodes B and C are unobserved. In the network of FIG. 5b, with the preference information of the relevant community members (A and C for B and A only for C) and with the historical information for the unlabelled nodes B and C, the preference profile for nodes B and C can be inferred from those of the their neighbours combined with their own historical information using a learned function $F(X_u)$ as discussed above. In the network of FIG. 5a, the path for preference propagation is less clear, as if the preferences for B and D are inferred in a different order, different results may be achieved. The method 100 of FIG. 1 addresses this issue though the iterative process of steps 114, 116, 110 and 112, through which the propagated preference profiles of the nodes B and D are constantly updated and the function $F(X_u)$ is re-learnt until a convergence threshold is reached. The method of FIG. 1 thus enables efficient preference propagation even in a sparsely labelled network.

The precise nature of the user attribute vectors X and the community preference vectors L in the method 100 of FIG. 1 may be tailored to the particular propagation task at hand. Table 1 below illustrates example sources of information for the user attribute vectors X and community preference vectors L according to different tasks representing different use cases.

TABLE 1

| | History | Community | Use Case |
| --- | --- | --- | --- |
| 1 | Browsing Information, VAS history | Friends' interest preferences from call graph | Topics of interest prediction |
| 2 | Browsing Information | Friends' interest preferences from browsing graph | Topics of interest prediction |
| 3 | Mobility information | Friends' hangout preferences from mobility graph | Hangout preference prediction |
| 4 | Browsing Information, VAS history | Friends' interest preferences and hangout preferences from mobility graph | Rank preferable location for a (new) business to start/re-locate |

In the first row of Table 1, the use case is establishment of general user interest preferences, and so the task is user interest propagation. The appropriate historical data for generation of user attribute vectors X is the user's browsing information and historical uptake and use of value added services. The relevant community is the user's friends as established from a call graph, and the preference information for the community preference vector L is the interest preferences of the user's friends.

The second row of Table 1, illustrates alternative sources of historical and social information for the same use case as the first row. In the alternative of the second row, the appropriate historical data may simply be the user's browsing information, and the relevant community may be the user's friends as established from a browsing graph. As in the first example of row 1, the preference information for the community preference vector is the interest preferences of the user's friends.

The third row of Table 1 illustrates a use case of establishing general user hangout location preferences, and so the task is hangout location propagation. The relevant historical data for the user is their mobility information, and the user's community comprises the user's friends from a mobility graph. The preference information for the community preference vector is the hangout preferences of the user's friends.

In the fourth row of Table 1, the use case is identification of a preferred location for start-up/relocation of a business. The task is therefore also user hangout location propagation, although the hangout locations may be targeted towards locations appropriate for the nature of the business concerned (entertainment, retail, food/drink provision etc). The relevant historical data is both browsing information and value added services data. The relevant community is the friends of a user drawn form a mobility graph, and the preference information for the community preference vector may include both the interest preferences and the hangout preferences of the user's friends.

Figure 4:
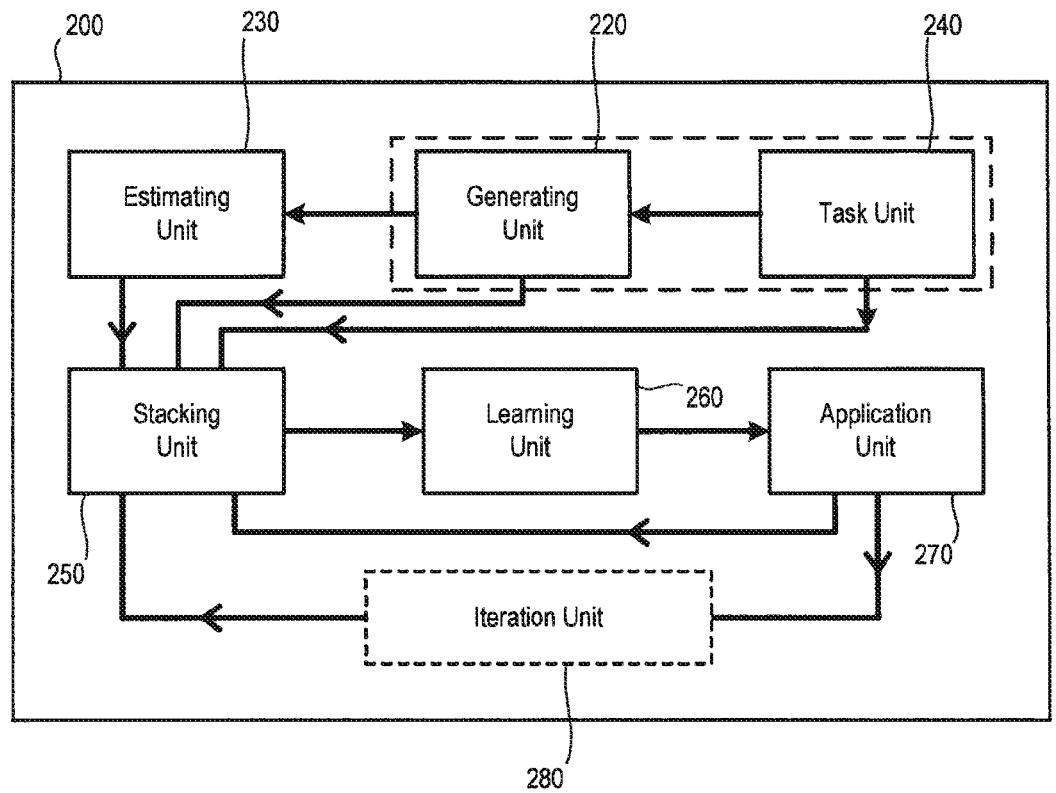
FIG. 4 is a block diagram illustrating functional units of an apparatus for propagating user preference information in a communications network.

The method 100 of FIG. 1 may be realised by a computer program which may cause a system, processor or apparatus to execute the steps of the method 100. FIG. 4 illustrates functional units of an apparatus 200 which may execute the steps of the method 100, for example according to computer readable instructions received from a computer program. The apparatus 200 may for example comprise a processor, a system node or any other suitable apparatus.

With reference to FIG. 4, the apparatus 200 comprises a generating unit 220, an estimating unit 230, a task unit 240, a stacking unit 250, a learning unit 260, an application unit 270 and may also comprise an iteration unit 280. It will be understood that the units of the apparatus are functional units, and may be realised in any appropriate combination of hardware and/or software.

The generating unit 220 may be configured to generate user attribute vectors for users in the network, for example under the influence of information received from the task unit 240, which may define the current task and so the information to be used for generating the attribute vectors. The task unit 240 may also supply community information to allow for assigning of user attribute vectors with reference to a user's community. In some embodiments, the generating unit 220 may be incorporated within the task unit 240. The estimating unit 230 may be configured to estimate user preference data, as discussed above with reference to step 104 of the method 100. The task unit 240 may be configured to define a community structure for the network according to the current task, and the stacking unit 250 may be configured to generate the stacked representation $X_u$ for users in the network, according to information received from the generating unit 220, estimating unit 230 and task unit 240. The learning unit 260 may be configured to learn the preference function $F(X_u)$ and the application unit 270 may be configured to apply the learned function $F(X_u)$ to the network nodes. The iteration unit 280 may be configured to manage iteration of the processes conducted by the stacking unit 250, learning unit 260 and application unit 270 until a convergence threshold is reached.

Figure 6:
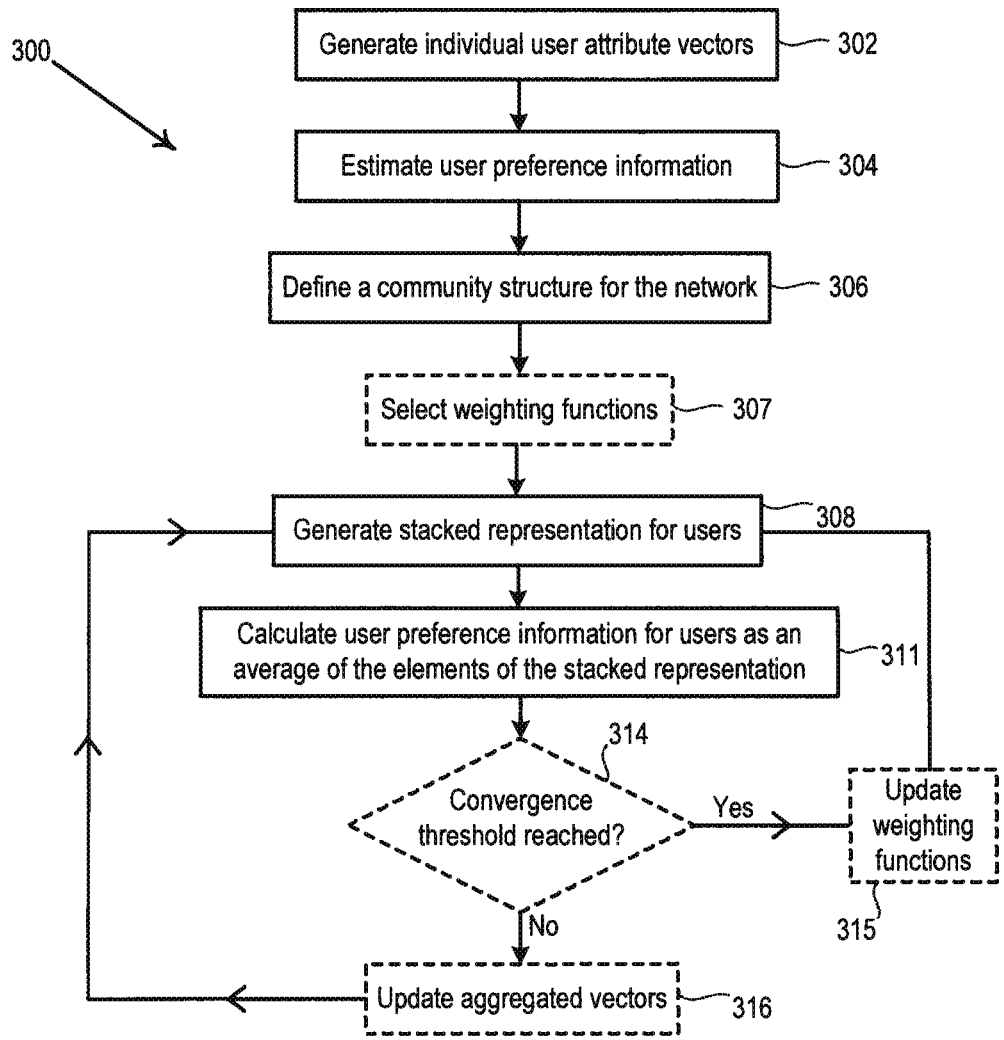
FIG. 6 is a flow chart illustrating process steps in a method for generating user preference information in a communications network.

FIG. 6 illustrates steps in a method 300 for generating user preference information in a communications network such as a telecommunications network. In certain situations or networks, it may not be possible to infer user preference information from user data for even a small subset $n_k$ of network nodes. In such situations, there is no labelled data providing preference information for propagation, and so according to the method 300 of FIG. 6, preference information is generated by drawing both on a user's historical data and upon the likely influence of his social connections. The method of FIG. 6 thus uses a similar stacked representation to that of FIG. 1 in order effectively to combine the influence of a user's historical actions with that of his social connections to infer user preferences. However, in contrast to the method 100 of FIG. 1, the method 300 of FIG. 6 is appropriate for use in a data set where no labelled data is available, i.e. no preference information can be inferred from user data to allow for the learning of functions $F_0(X)$ and $F(X_u)$. The following discussion illustrates the method 300 of FIG. 6 with reference to generation of interest preferences. However, it will be appreciated that other preferences, including for example location, entertainment or music preferences may also be generated, as illustrated in the worked examples discussed later in the description.

Referring to FIG. 6, in a first step 302, individual user attribute vectors are generated for users in the network. As in the method 100, this may involve processing historical data for the user appropriate to the task in hand, or, if such data is not available, assigning a user attribute vector to a user on the basis of other users within the network. The method 300 then proceeds at step 304 to estimate user preference information for the users. In the method 100 of FIG. 1, this estimate is made by learning a function linking user attribute vector X to preference information based on the labelled subset $n_k$. In the absence of a labelled subset, according the method 300 of FIG. 6, the preference information may be estimated using known estimation formulae which generate an estimate of user preference based upon relevant historical data. An example of such a formula is the typical recommender system formulation discussed below in the first worked example.

The method 300 then proceeds to define a community structure for the network at step 306, substantially as described above with reference to step 106 of FIG. 1. The method then proceeds to select weighting functions at step 307 (discussed in further detail below) before generating a stacked representation for users at step 308. The stacked representation $X_{u2}$ of the method 300 comprises a vector $X_2$ of the user's estimated preference information augmented with an aggregated vector L of the estimated preference information of members of the user's community. Thus $X_{u2}$, in common with $X_u$, comprises an element drawn exclusively form the user's own historical data and an element drawn form the user's social connections: $X_{u2}=X_2\Psi L$. As for the method 100, the vector L may be a rank aggregated vector, an averaged vector, a weighted averaged vector with weights assigned in proportion to the closeness of the connection between a user and each of his community members, etc. Also as for the method 100, the augment function $\Psi$ may be a summation, an append or any other suitable function. In the present example the augment function is a summation: $X_{u2}=X_2+L$.

In the method 100 of FIG. 1, a function $F(X_u)$ is learned in order to generate preference information from the stacked representation, based upon the labelled subset $n_k$. With no labelled subset available, the corresponding function $F_2(X_{u2})$ cannot be learned from a labelled subset but is instead set to be a weighted average of the two elements of $X_{u2}$: $X_2$, representing preference estimation for the user, and L, representing aggregated preference estimation for members of the user's community. The function $F_2(X_{u2})$ is therefore represented as $F_2(X_{u2})=W1*X_2+W2*L$, where $W1+W2=1$. The weighting factors W1 and W2 are chosen in step 307 and control the relative influence of the user's historical data and social connections in generating the user preference profile. The weighting factors may be weighting functions, vectors or may be scalars. They may be selected to place equal weight on each element, or to place greater weight on historical data or social connections, according to the nature of the current task, the data set or any other appropriate factor.

Having selected weighting functions and generated the stacked representation, the method 300 thus proceeds to calculate user preference information using the function $F_2(X_{u2})$ at step 311.

Two iteration loops may be employed to refine the calculated user preference information and provide an increasingly accurate result. In a first iteration loop, the aggregated vectors L may be updated in step 316 with the calculated preference information, so updating the stacked representation $X_{u2}$ for all users, and the preference information may be recalculated by applying $F_2(X_{u2})$ to this updated stacked representation. This iteration loop may be continued until a convergence threshold is reached, which threshold is checked at step 314. As for the method 100 of FIG. 1, the convergence threshold may be a limiting value Δ of change in preference information between iterations. Once a convergence threshold has been reached (Yes in step 314), a second iteration loop may be introduced through updating of the weighting functions W1 and W2 in step 315. Different values of the weighting functions W1 and W2 may be trialled and the most effective values for a particular data set may be selected empirically. In some examples, this extra iteration loop may be replaced by the use of advanced parameter estimation techniques.

The method 300 of FIG. 6 may be employed as part of a clustering based recommendation method, as illustrated in the examples discussed below. According to standard clustering based recommendation methods, preference information based on historical user data alone is used to compute a cluster preference distribution. In contrast, and according to the present disclosure, the method 300 of FIG. 6 may be used to generate preference information based on an estimate from historical data and on information extracted from a user's social connections, so providing a more accurate indication of user preference. This more accurate user preference information may then be used to compute a cluster preference distribution and so enable more pertinent recommendations to be made.

The following two worked examples demonstrate application of the method 300 to an example use case and the effectiveness of the stacked representation.

In a first worked example, the use case is events preference ranking in a social network. The task is to predict what events a user will be interested in based upon their prior historical information and friendship information, combined with metadata information for past and future events. Suitable events may then be recommended to users. In this example case, user historical data includes user responses to previously recommended events. Event metadata includes event description in text form. User friendship information includes user friendship links in the social network. 15399 users are employed as a training set to develop the recommendation process and 10238 users form a test population. The events space consists of a total of 24144 events, with approximately 3 million pairs of user-event history information. The task is user event preference generation in an unlabelled network, as there is no subset of users with preference information for future events. The method 300 above is employed in combination with a clustering based recommendation method in order to generate recommendations for users. For the purposes of comparison, cluster based recommendation using two prior known methods for generating preference information is also conducted, and the results of the three different methods are compared in Table 2 below, using the mean average precision (MAP) of the three methods as a basis for comparison of their effectiveness.

According to the first prior known method, the cluster based recommendation method performs steps A to F as discussed below:

Step A) Cluster events from the training set using the event description. Clustering is performed using the K-means algorithm on term frequency representation of the event description.

Step B) Represent each user as a vector according to their historical data. For each event, assign a rating value according to the user's response to the event recommendation: 2 for a "Yes" response, 1 for a "Maybe" response, 0 for no response and −1 for a "No" response.

Step C) For each test user, compute similarity (1-Euclidean distance) to other users using the vector generated in step b. The similarly is captured as a weight between two users, thus $w_{a,u}$ is the weight between user a and user u.

Step D) Estimate user preference for an event using the recommender system formulation below:

$$P_{a,i} = \bar{r}_a + \frac{\sum_{u \in U_a} (r_{u,i} - \bar{r}_u) w_{a,u}}{\sum_{u \in U_a} \|w_{a,u}\|}$$

Where:
$P_{a,i}$ is the estimated preference of user a for event i,
$\bar{r}_a$ is the average rating value of user a,
$U_a$ is the set of training users,
$r_{u,i}$ is the rating given by user u to event i, and
$W_{a,u}$ is the weight between user a and user u.

Step E) Using the user event preferences computed in step d, compute event cluster preference distribution; if there are K clusters, this results in a 1×K preference vector. The vector is computed by summing the preference values of events belonging to a single cluster and then normalising across cluster preferences.

Step F) Given a test user, infer preferences for test events based on the cluster preferences computed in step e. Map each test event to a cluster by computing the distance to the closest centroid. The test event preference for a user is taken as the user's preference for the event cluster the test event belongs to.

According to the second prior known method, the cluster based recommendation method performs steps a to f substantially as described above, with the exception that in step d, $U_a$ comprises the set of users belonging to the same community as the test user. This set is established by constructing a social graph containing user friendship information, and using the fast unfolding community detection algorithm to identify communities.

According to the method 300 of the present invention, steps a to e of the above process are conducted substantially as described above. This involves generating user attribute vectors in step b and estimating user preference information in step d. Overall network preference information is assigned for those users for whom the relevant historical information is missing. A stacked representation is then generated for users comprising the user's estimated preference information $X_2$ augmented with an aggregated vector L of estimated preference information for members of the user's community. In the present worked example the aggregated vector L is a weighted average of the estimated preferences of the members of the user's community, with weights being assigned according to the closeness of the connection between the user and each individual member of his community. These weights are calculated in step c of the above described process.

User preference information is then calculated using the function $F_2(X_{u2})=W1*X_2+W2*L$, where $W1+W2=1$. The aggregated vectors are then updated with the calculated user preference information and the calculation is repeated until convergence is reached. Different values of the weighting factors W1 and W2 are then trialled until the best values for W1 and W2 are established using an exhaustive search. The calculated preference information is then used in steps e and f of the recommender method described above.

Results comparing the two prior known methods and the method of the present invention are given below, where K is the number of clusters used.

TABLE 2

| K | 25 | 50 | 75 | 100 | 125 | 150 | 175 | 200 | Avg MAP |
|---|---|---|---|---|---|---|---|---|---|
| Prior method I | 0.43819 | 0.43582 | 0.43692 | 0.43715 | 0.43819 | 0.43616 | 0.43785 | 0.43706 | 0.43716 |
| Prior method II | 0.42814 | 0.42599 | 0.43076 | 0.42096 | 0.41859 | 0.42709 | 0.43234 | 0.41983 | 0.4254 |
| Proposed method | 0.46297 | 0.47935 | 0.47373 | 0.47432 | 0.48102 | 0.47802 | 0.48141 | 0.47045 | 0.47515 |

It can be seen from the results in Table 2 that the method of the present invention was found to be more effective than either of the prior known methods, regardless of the number of clusters used.

The second worked example is used to demonstrate the effectiveness of the stacked representation of the methods of the present invention. The use case is music preference ranking in a social network. The task is to predict user ranking of songs based upon user historical data, user social connections and a labelled subset of data.

A page on a social network was created containing 100 songs, 20 songs from each of years 2013, 2012, 2011, 2010 and 2009. 150 volunteers were asked to rank the songs in order of preference. These preference rankings were collated together with the friendship ties of the volunteers in the social network. In this example, user historical data includes user song ranking for the years 2009 to 2012. User rankings of 2013 songs were available as a labelled subset comprising a randomly chosen 20% of users. The task was to propagate the preferences of these randomly chosen 20% to the remaining 80% for the 2013 songs.

As in the first worked example, a prior method is also used to provide a basis for comparison. In this case, the clustering based recommendation method is used with the user's historical data as a feature vector. This is compared with the clustering based recommendation method using the stacked representation $X_{u2}=X_2\Psi L$.

In the prior method, the clustering algorithm for chains was used with the historical rating information for the users. With K songs or items, the historical vector is a 1×K vector in which each element is the rating given by the user for that particular item. If an item was not rated, it is given the value 0.

In the test method, the clustering algorithm for chains was used with the stacked representation $X_{u2}=X_2\Psi L$, where $X_2$ is the user's rating history and L is the averaged vector of the rating histories of the members of the user's community, $\Psi$ is a sum operation.

With the clusters assembled, cluster based recommendation was used, with each test user receiving a recommendation based upon the user's cluster centroid. The MAP results for the two test methods are given below in Table 3, for different numbers of clusters used.

TABLE 3

| METHOD | CLUSTERS | | |
|---|---|---|---|
| | 10 | 15 | 20 |
| Prior method | 0.53174 | 0.52516 | 0.53904 |
| Test method | 0.73878 | 0.70796 | 0.75538 |

It can be seen from the results table that the stacked representation of the test method was more effective than the prior method regardless of the number of clusters used.

Aspects of the present invention provide a method and apparatus that enables the propagation or generation of user preference information in a communications network. By combining insight from a user's historical behaviour and from the user's social connections, a more accurate profile of user preferences can be achieved, which profile may then be used in a range of network activities, including targeted advertising, recommendation services and customer retention activities. The methods disclosed enable the extrapolation of preference information in a uniform way across users, and in networks where minimal prior information is available.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for propagating user preference information in a communication network, the method comprising:
    identifying a first subset of users within a communication network for whom user preference information is available;
    generating a user attribute vector for each user within the communication network based on historical data of the respective user;
    generating an estimated user preference information for a second subset of users within the communication network, each user of the second subset of users being outside of the first subset, as a function of the generated user attribute vector;
    defining a community structure for each user within the communication network comprising characterizing links between a user and another user which allow the other user to be considered as a member of the user's community structure;
    generating a stacked representation for each user within the communication network, the representation comprising the generated user attribute vector of the respective user augmented with an aggregated vector generated based on the estimated user preference information or the user preference information of members of the respective user's community structure;
    learning a function relating the stacked representation to the user preference information, using the first subset;
    applying the learned function to each user of the second subset of users to generate user preference information for each user of the second subset of users;
    updating the aggregated vector based on the user preference information generated for each user of the second subset of users through applying the learned function; and
    repeating the steps of learning the function relating the stacked representation to the user preference information, applying the learned function to each user of the second subset of users, and updating the aggregated vector until a convergence threshold is reached.

2. The method as claimed in claim 1, wherein generating the user attribute vector comprises processing historical data held for the respective user.

3. The method as claimed in claim 2, wherein, if no historical data is held for a user, generating the user attribute vector based upon historical data in the network.

4. The method as claimed in claim 1, wherein generating the estimated user preference information comprises:
    learning a function relating the generated user attribute vector to the user preference information, using the first subset; and
    applying the learned function to generate the estimated user preference information for each user of the second subset.

5. The method as claimed in claim 4, wherein if no historical data is held for a user, generating the estimated user preference information based on user preference information within the communication network.

6. The method as claimed in claim 1, wherein augmenting the generated user attribute vector with the aggregated vector comprises applying at least one of: an append operation; a summation; an average; and a projection algorithm.

7. The method as claimed in claim 1, wherein the aggregated vector comprises at least one of: a rank aggregated vector; and an averaged vector.

8. The method as claimed in claim 7, wherein the aggregated vector is an averaged vector, wherein the average is weighted according to a strength of links between a user and individual members of the user's community structure.

9. A computer program product comprising a non-transitory computer readable medium storing computer instructions for configuring a computer to:
    identify a first subset of users within a communication network for whom user preference information is available;
    generate a user attribute vector for each user within the communication network based on historical data of the respective user;
    generate an estimated user preference information for a second subset of users within the communication network, each user of the second subset of users being outside of the first subset, as a function of the generated user attribute vector;
    define a community structure for each user within the communication network comprising characterizing links between a user and another user which allow the other user to be considered as a member of the user's community structure;
    generate a stacked representation for each user within the communication network, the representation comprising the generated user attribute vector for the respective user augmented with an aggregated vector generated based on the estimated user preference information or the user preference information of members of the respective user's community structure;

learn a function relating the stacked representation to the user reference information, using the first subset;

apply the learned function to each user of the second subset of users to generate user preference information for each user of the second subset of users;

update the aggregated vector based on the user preference information generated for each user of the second subset of users through applying the learned function; and repeat the steps of learning the function relating the stacked representation to the user preference information, applying the learned function to each user of the second subset of users, and updating the aggregated vector until a convergence threshold is reached.

10. An apparatus for propagating user preference information in a communication network, the apparatus comprising:

an identifying unit configured to identify a first subset of users within a communication network for whom user preference information is available;

a generating unit configured to generate a user attribute vector for each user within the communication network based on historical data of the respective user;

an estimating unit configured to generate an estimated user preference information for a second subset of users within the communication network, each user of the second subset of users being outside of the first subset, as a function of the generated user attribute vector;

a task unit configured to define a community structure for each user within the communication network comprising characterizing links between a user and another user which allow the other user to be considered as a member of the user's community structure;

a stacking unit configured to generate a stacked representation for each user within the communication network, the representation comprising the generated user attribute vector of the respective user augmented with an aggregated vector generated based on the estimated user preference information or the user preference information of members of the respective users community structure;

a learning unit configured to learn a function relating the stacked representation to the user preference information, using the first subset;

an application unit configured to apply the learned function to each user of the second subset of users to generate user preference information for each user of the second subset of users;

the stacking, learning and application units further configured to update the aggregated vector with the user preference information generated for each user of the second subset of users through applying the learned function by the application unit; and an iteration unit configured to monitor a convergence threshold, the convergence threshold being used for repeating the steps of learning the function relating the stacked representation to the user preference information, applying the learned function to each user of the second subset of users, and updating the aggregated vector until the convergence threshold is reached.

11. The apparatus as claimed in claim 10, wherein the generating unit is configured to generate the user attribute vector by processing historical data held for the respective user.

12. The apparatus as claimed in claim 11, wherein if no historical data is held for a user, the generating unit is configured to generate the user attribute vector by assigning an attribute vector based upon historical data in the communication network.

13. The apparatus as claimed in claim 10, wherein the estimating unit is configured to generate the estimated user preference information by:

learning a function relating the generated user attribute vector to the user preference information, using the first subset; and applying the learned function to generate the estimated user preference information for each user of the second subset.

14. The apparatus as claimed in claim 13, wherein if no historical data is held for a user, the estimating unit is configured to generate the estimated user preference information based on user preference information within the communication network.

* * * * *